(12) United States Patent
Takashima

(10) Patent No.: US 9,282,230 B2
(45) Date of Patent: Mar. 8, 2016

(54) AUTOMATIC TRACKING CAMERA SYSTEM

(71) Applicant: CANON KABUSHIKI KAISHA, Tokyo (JP)

(72) Inventor: Yuji Takashima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 559 days.

(21) Appl. No.: 13/672,809

(22) Filed: Nov. 9, 2012

(65) Prior Publication Data

US 2013/0120585 A1 May 16, 2013

(30) Foreign Application Priority Data

Nov. 15, 2011 (JP) .................................. 2011-249930

(51) Int. Cl.
*H04N 7/18* (2006.01)
*G08B 21/00* (2006.01)
*G01S 13/93* (2006.01)
*H04N 5/232* (2006.01)
*G01S 3/786* (2006.01)

(52) U.S. Cl.
CPC .............. *H04N 5/232* (2013.01); *G01S 3/7864* (2013.01)

(58) Field of Classification Search
CPC .................................. H04N 7/18; H04N 5/228
See application file for complete search history.

(56) References Cited

U.S. PATENT DOCUMENTS

| 7,433,588 B2 | 10/2008 | Oya | |
|---|---|---|---|
| 2003/0067542 A1* | 4/2003 | Monroe | 348/148 |
| 2004/0008253 A1* | 1/2004 | Monroe | 348/143 |
| 2010/0007751 A1* | 1/2010 | Icho et al. | 348/222.1 |

FOREIGN PATENT DOCUMENTS

| JP | 2004260496 A | 9/2004 |
|---|---|---|
| JP | 2006148260 A | 6/2006 |
| JP | 2006270404 A | 10/2006 |

OTHER PUBLICATIONS

Japanese Office Action issued in Japanese counterpart application No. JP2011-249930, dated Sep. 1, 2015.

* cited by examiner

*Primary Examiner* — Sath V Perungavoor
*Assistant Examiner* — Patricia I Young
(74) *Attorney, Agent, or Firm* — Rossi, Kimms & McDowell LLP

(57) ABSTRACT

An automatic tracking camera system includes: an image pickup unit; a driving unit for rotating the image pickup unit in panning or tilting direction; a signal receiver for receiving an object information signal; an image signal processor for recognizing an object in an image and detecting motion of the object in the image; a controller for controlling the image pickup unit, the driving unit, and the image signal processor; and a memory for storing, for each passageway, standby positions at which the image signal processor detects the object. The controller calculates an approaching passageway and angle of the object; selects a corresponding standby position from the standby positions stored in the memory; drives the driving unit and a lens apparatus to the standby position; and controls, when the image signal processor recognizes the object, the driving unit and the lens apparatus to automatically track the object based on detected information.

8 Claims, 3 Drawing Sheets

AUTOMATIC TRACKING CAMERA SYSTEM

BACKGROUND OF THE INVENTION

1. Field of the Invention

The present invention relates to an automatic tracking camera system for automatically tracking an object to be picked up as an image, and more particularly, to an automatic tracking camera system for automatically tracking an aircraft as an object to be tracked.

2. Description of the Related Art

A camera including a camera platform (hereinafter referred to as "platform camera"), which is constructed of a camera mounted to an electric camera platform and is capable of performing a rotating operation such as panning and tilting, has an operation apparatus connected thereto through a cable or wireless communication so that the camera and the camera platform can be controlled in a remote place. An operator operates the operation apparatus while viewing an image displayed on a monitor screen, to thereby control the camera mounted to the camera platform and the camera platform.

In recent years, there has been proposed an automatic tracking camera system for automatically recognizing and tracking an object through use of an image recognition technology provided to the platform camera. With this automatic tracking camera system, even when the operator does not continue to manually change the direction of the platform camera for adjusting the direction of the platform camera to the moving object, the moving object can be tracked automatically and an image thereof can be picked up. However, in order to perform the automatic tracking/image pickup operation through use of the image recognition technology, the object needs to appear within the range of the camera, otherwise the automatic tracking/image pickup operation cannot be started. In particular, in a case of picking up an image of landing of an aircraft, the runway and angle for the landing may be changed depending on meteorological conditions, such as a wind speed and visibility, and an installation condition of an instrument landing system, and hence the automatic tracking through use of the image recognition technology cannot be performed in some cases.

For example, Japanese Patent Application Laid-Open No. 2006-270404 discloses a technology of detecting a position and a direction of the aircraft through use of a radar apparatus.

However, the conventional technology disclosed in Japanese Patent Application Laid-Open No. 2006-270404 is a technology of monitoring the aircraft, and hence the position and the direction of the aircraft are detected through use of the radar apparatus. The installation of the radar apparatus for automatically tracking the aircraft and picking up an image thereof for general purposes is not feasible in terms of cost and installation space to be ensured.

SUMMARY OF THE INVENTION

The present invention provides an automatic tracking/image pickup apparatus capable of performing an automatic tracking/image pickup operation through detection of approaching runway and angle of an aircraft without using an expensive and large radar apparatus.

According to an exemplary embodiment of the present invention, an automatic tracking camera system, includes: an image pickup unit including a lens apparatus and an image pickup apparatus; a driving unit for rotating the image pickup unit in at least one of a panning direction and a tilting direction; a signal receiver for receiving an object information signal from an object; an image signal processor for recognizing the object in an image obtained by the image pickup unit, and detecting a motion of the object in the image; a controller for controlling the image pickup unit, the driving unit, and the image signal processor; and a memory unit for storing, for each of one or more passageways, standby positions at which the image pickup unit is brought into a standby state so that the image signal processor detects the object, in which the controller is configured to: calculate an approaching passageway and an approaching angle of the object based on the object information signal received by the signal receiver; select, based on a result of the calculation, a corresponding standby position from among the standby positions stored in the memory unit; drive the driving unit and the lens apparatus to the selected corresponding standby position; and control, when the image signal processor has recognized the object, the driving unit and the lens apparatus so as to automatically track the object based on information detected by the image signal processor.

It is possible to provide the automatic tracking camera system capable of performing the automatic tracking/image pickup operation for the aircraft through the detection of the approaching runway for takeoff and landing and the angle of the aircraft without using an expensive and large radar apparatus.

Further features of the present invention will become apparent from the following description of exemplary embodiments with reference to the attached drawings.

DESCRIPTION OF THE EMBODIMENTS

In the following, an automatic tracking camera system according to exemplary embodiments of the present invention is described in detail with reference to the attached drawings.

Embodiment

Figure 1:
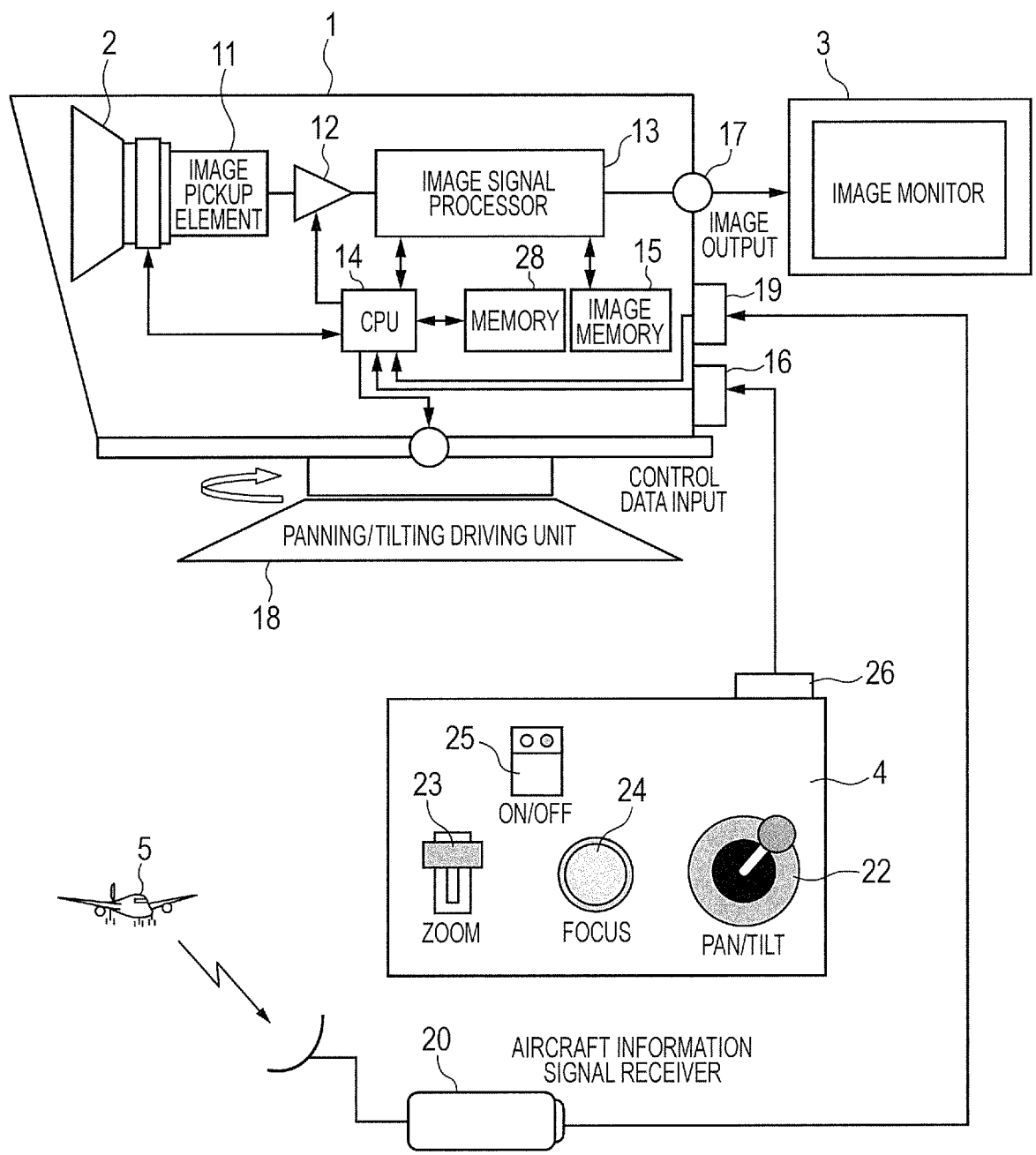
FIG. 1 is a diagram illustrating a configuration of an automatic tracking camera system according to the present invention.

FIG. 1 is a system diagram illustrating an automatic tracking camera system according to an embodiment of the present invention by taking, as an example, a platform camera, which is operated in a remote place as an image pickup apparatus having a tracking function. Referring to FIG. 1, a system overview is described.

As illustrated in FIG. 1, the automatic tracking camera system of the present invention includes an image pickup unit, which includes a lens apparatus 2 and an image pickup apparatus including an image pickup element 11, a platform camera 1, which has the image pickup unit mounted thereto and is operated in a remote place, an image monitor 3 for displaying an image picked up by the platform camera 1, an operation apparatus 4 for operating the platform camera 1, and an aircraft information signal receiver 20 for receiving an aircraft information signal (object information signal) of an aircraft 5 as an object.

In the platform camera 1, the object image picked up via the lens apparatus 2 is formed on the image pickup element 11, and the obtained image is adjusted in level by an amplifier 12 and then processed on a pixel basis by an image signal processor 13. After that, the image is temporarily written as image data into an image memory 15, and is read as necessary for object detection and motion detection. The image data read from the image memory 15 is converted by the image signal processor 13 conforming to an output format in which the image can be displayed on the image monitor 3, and is output from an image output terminal 17. A CPU (processor circuit) 14 serving as a controller controls the image signal processor 13, a panning/tilting driving unit 18, and a zooming/focusing driving circuit of the lens apparatus 2.

An operation lever 22 for driving the panning/tilting driving unit 18 to rotate the platform camera 1 in a panning direction and a tilting direction, a zooming adjustment lever 23 for changing the zooming of the lens apparatus 2, and a focusing operation knob 24 are mounted to the operation apparatus 4. Further, an automatic tracking button 25 for switching ON and OFF of the automatic tracking is also mounted to the operation apparatus 4. Outputs from the automatic tracking button 25, the zooming adjustment lever 23, and the focusing operation knob 24 are input to a CPU (not shown) mounted to the operation apparatus 4, and are converted into control signals, which are output from a communication terminal 26. The control signals output from the communication terminal 26 are received by the CPU (14) of the platform camera 1 via a communication terminal 16 of the platform camera 1. The CPU (14) interprets the received control signals, and controls control targets in accordance with contents of the control signals.

The aircraft 5 transmits, by wireless, an automatic dependent surveillance-broadcast signal (hereinafter referred to as "ADS-B signal") containing information such as an identifier, a current horizontal position, an altitude, and an airspeed. The aircraft information signal receiver 20 detects the horizontal position, the altitude, and the like (positional information) of the aircraft 5 based on the ADS-B signal (object information signal or aircraft information signal) transmitted from the aircraft 5, and the detected data is received by the CPU (14) via a communication terminal 19 of the platform camera 1.

Figure 2:
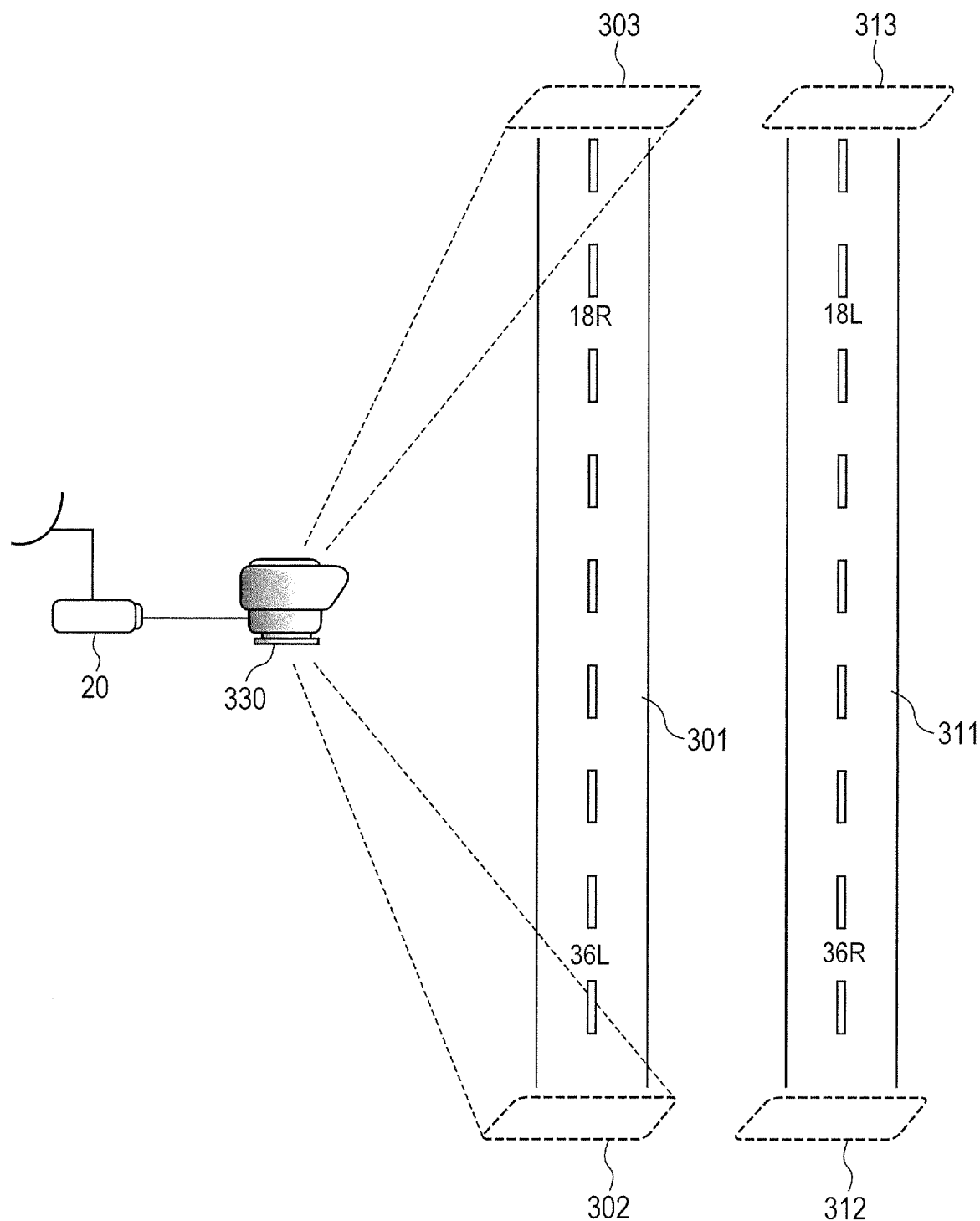
FIG. 2 is a diagram illustrating a positional relationship between runways and an installed platform camera, and angles of view of the platform camera.

FIG. 2 illustrates an example in which the platform camera 1 is installed near a runway as a passageway along which the aircraft (object) moves. As the runway, there are two runways referred to as a runway 301 assigned with runway numbers 18R and 36L, and a runway 311 assigned with runway numbers 18L and 36R. Following the practice of air traffic control, the runways are hereinafter represented by the respective runway numbers. That is, the runways 18R and 36L are located on the same runway 301, but approaching directions of the aircraft differ by 180 degrees between the runways. A platform camera 330 is installed at a position which ensures visibility in a longitudinal direction of the runways through a panning operation. An angle of view 302 refers to an angle of view at which the platform camera 330 is brought into a standby state to pick up an image of an aircraft approaching the runway 36L for landing (performing a landing on the runway 301 from a downward direction in FIG. 2). A panning position and a tilting position of the panning/tilting driving unit 18 and a zoom position and a focus position of the lens apparatus 2 corresponding to the angle of view 302 are preset and stored in a memory 28 serving as a memory unit of the platform camera 330. Accordingly, there are stored setting values of the states of the panning/tilting driving unit 18 and the lens apparatus 2 corresponding to an optical axis direction of the lens apparatus 2, an object distance, and the angle of view, at which the platform camera 330 is brought into a standby state to automatically track the aircraft. Similarly, there are preset an angle of view 303 at which the platform camera 330 is brought into a standby state to pick up an image of an aircraft approaching the runway 18R for landing (performing a landing on the runway 301 from an upward direction in FIG. 2), an angle of view 312 at which the platform camera 330 is brought into a standby state to pick up an image of an aircraft approaching the runway 36R for landing (performing a landing on the runway 311 from the downward direction in FIG. 2), an angle of view 313 at which the platform camera 330 is brought into a standby state to pick up an image of an aircraft approaching the runway 18L for landing (performing a landing on the runway 311 from the upward direction in FIG. 2), panning positions and tilting positions of the panning/tilting driving unit at which the platform camera 330 is brought into a standby state at image pickup positions corresponding to the respective angles of view, and zoom positions and focus positions of the lens apparatus 2 are preset in advance. Those values are stored in the memory 28 serving as the memory unit.

An air traffic controller comprehensively determines the runway and angle for the landing depending on meteorological conditions, such as a wind direction and visibility, and whether or not an instrument landing system (ILS) is installed to the runway, and instructs the aircraft by wireless. Therefore, a third person who is not directly involved in the operation of the aircraft cannot know the runway (including angle) for the landing before the landing is performed.

Figure 3:
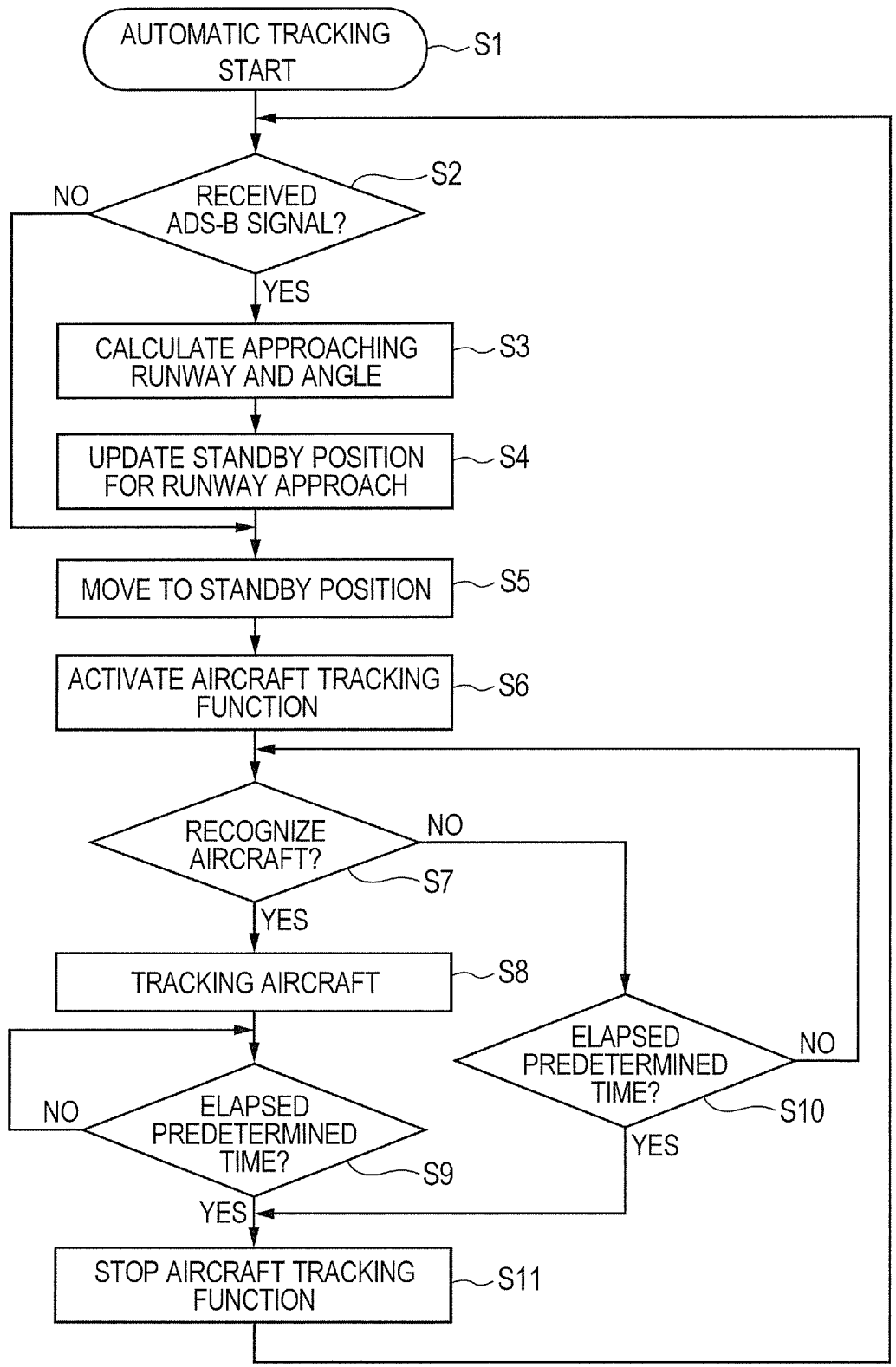
FIG. 3 is a flow chart illustrating a flow of an automatic tracking/image pickup operation for an aircraft through use of the automatic tracking camera system according to the present invention.

Next, referring to FIG. 3, a flow of an automatic tracking/image pickup operation performed for the aircraft by the automatic tracking camera system is described.

When the automatic tracking button 25 is switched ON in the operation apparatus 4 of FIG. 1, a control signal for starting the automatic tracking is transmitted from the operation apparatus 4 to the CPU (14) so that automatic tracking processing is started (S1).

In S2, the CPU (14) determines whether or not the aircraft information signal receiver 20 has received the ADS-B signal and position data and altitude data of the aircraft have been input to the CPU (14) via the communication terminal 19. When the CPU (14) has received the position data and the altitude data of the aircraft, the processing proceeds to S3, in which the CPU (14) calculates, based on the data, approaching runway and angle of the aircraft for the landing, that is, one of the runways 18R, 36L, 18L, and 36R.

In S4, based on the data on the approaching runway and angle of the aircraft, which is obtained as a calculation result of S3, the CPU (14) determines and selects appropriate one of the preset angles of view 302, 303, 312, and 313 at which the platform camera 330 is brought into a standby state to pick up an image of the aircraft, and changes the setting values of the panning position and the tilting position of the panning/tilting driving unit 18 and the zoom position and the focus position of the lens apparatus 2 in the platform camera 330 to preset values corresponding to the selected angle of view.

When the CPU (14) has not received the position data and the altitude data of the aircraft in S2, the processing proceeds to S5. Accordingly, when the CPU (14) cannot acquire the position data and the altitude data of the aircraft because, for example, the aircraft has not transmitted the ADS-B signal, the CPU (14) does not update the setting values of the panning position and the tilting position of the panning/tilting driving unit 18 and the zoom position and the focus position of the lens apparatus 2, and uses the setting values based on the information obtained through the reception of the previous ADS-B signal, to thereby control the panning/tilting driving unit 18 and the lens apparatus 2 so that the platform camera 330 moves to the previous standby position.

In S5, the CPU (14) moves the platform camera 330 at the angle of view of the standby position (the standby position includes the panning position and the tilting position of the panning/tilting driving unit 18 and the zoom position and the focus position of the lens apparatus 2) so as to satisfy the values of the set panning position and tilting position of the panning/tilting driving unit 18 (optical axis direction of the lens apparatus 2) and the set zoom position and focus position of the lens apparatus 2.

After the platform camera 330 is oriented to the standby position, in S6, the CPU (14) turns ON an aircraft recognition function, and detects whether or not the aircraft is included in the image picked up by the platform camera 330 through image recognition processing (image processing). The image recognition processing is performed through application of a known image recognition technology such as template matching.

In S7, the CPU (14) determines whether or not the aircraft has been recognized through the image recognition processing. When the aircraft has been recognized, in S8, based on information obtained through the image recognition processing, the CPU (14) performs an automatic tracking/image pickup operation by automatically controlling the panning position and the tilting position of the panning/tilting driving unit 18 and the zoom position and the focus position of the lens apparatus 2 so that the aircraft having a specified size is displayed at a position on the screen which is specified in advance. Note that, the position and the size of the aircraft on the screen at the time of tracking are preset before the processing in S1.

In S9, the CPU (14) measures a period of time required for tracking the aircraft and picking up an image. When a predetermined time has elapsed, the CPU (14) turns OFF the aircraft recognition function (S11), and returns to the processing of determining whether or not the aircraft information signal receiver 20 has received the position data and the altitude data of the aircraft. The predetermined time herein refers to a period of time from the start of the automatic tracking/image pickup operation upon the recognition of the aircraft through the image recognition processing until the completion of the landing of the aircraft. This period of time is a period of time which is measured in advance in the design stage, and an appropriate period of time is set.

When the aircraft has not been recognized through the image recognition processing in S7, the CPU (14) continues the image recognition processing. When the aircraft has not been recognized even though the predetermined time which is set in advance has elapsed, the CPU (14) turns OFF the aircraft recognition function (S11), and returns to the processing of determining whether or not the aircraft information signal receiver 20 has received the position data and the altitude data of the aircraft.

The above-mentioned embodiment has described the application of the automatic tracking camera system of the present invention by taking, as an example, the case of landing of the aircraft on the runway. However, the present invention is not limited thereto, and is similarly applicable to a case of takeoff of the aircraft from the runway. That is, the present invention is also applicable to the following configuration. Specifically, the angles of view at which the platform camera is brought into a standby state to pick up an image of an aircraft at the time of takeoff are preset for the respective runways, and panning positions and tilting positions of the panning/tilting driving unit 18 and zoom positions and focus positions of the lens apparatus 2 corresponding to the respective angles of view are stored in the memory. When the ADS-B signal is received from the aircraft that is to take off, a runway for the takeoff is specified, and the platform camera is driven so as to satisfy the corresponding preset values. After the aircraft is recognized on the screen, the automatic tracking is started through the image processing to track the aircraft that is taking off.

Further, the present invention is not limited to the aircraft, and is applicable to an object which is moving while transmitting the positional information of the object itself. For example, the present invention is applicable to an object such as a vehicle running on the ground and a ship or vessel sailing on the water as well as the aircraft. Further, the passageway refers to a space in which movement of the object to be tracked is scheduled or expected, and the present invention is applicable to an air route, a road, a railway, and a waterway as passageways in place of the runway. Depending on the kinds of object and passageway, the driving unit to be used may be a driving unit for rotating the image pickup unit in the panning direction and the tilting direction, and may further be a driving unit for rotating the image pickup unit in any one of the panning direction and the tilting direction.

While the present invention has been described with reference to the exemplary embodiment, it is to be understood that the invention is not limited to the disclosed exemplary embodiment. Although there has been described a case where the aircraft approaches two runways, the scope of the following claims is to be accorded the broadest interpretation so as to encompass all such modifications and equivalent structures and functions, such as a case where the aircraft approaches one or more runways.

This application claims the benefit of Japanese Patent Application No. 2011-249930, filed Nov. 15, 2011, which is hereby incorporated by reference herein in its entirety.

What is claimed is:

1. An automatic tracking camera system, comprising:
   an image pickup portion comprising a lens apparatus and an image pickup apparatus;
   a driver configured to rotate the image pickup unit in at least one of a panning direction and a tilting direction;
   a signal receiver configured to receive an object information signal which an object to be tracked is transmitting;
   an image signal processor configured to recognize the object in an image obtained by the image pickup unit, and detect a motion of the object in the image;
   a controller configured to control the image pickup unit, the driving unit, and the image signal processor; and
   a memory configured to store, for each of one or more passageways, standby positions at which the image pickup portion is brought into a standby state so that the image signal processor detects the object,
   wherein the controller is configured to:
      obtain an approaching passageway and an approaching direction of the object based on the object information signal received by the signal receiver;
   select, based on the approaching passageway and the approaching direction, a corresponding standby position from among the standby positions stored in the memory;
   control the driver to the selected corresponding standby position; and
      control, when the image signal processor has recognized the object, the driver so as to automatically track the object based on information detected by the image signal processor, and
      wherein, when the signal receiver has not acquired a new object information signal after the object is automatically tracked for a predetermined time, the controller controls the driver and the lens apparatus to a previous standby position.

2. An automatic tracking camera system, comprising:
an image pickup portion comprising a lens apparatus and an image pickup apparatus;
a panning/tilting driver configured to rotate the image pickup portion in at least one of a panning direction and a tilting direction;
a signal receiver configured to receive an aircraft information signal which an aircraft to be tracked is transmitting;
an image signal processor configured to recognize the aircraft in an image obtained by the image pickup portion, and detect a motion of the aircraft in the image;
a controller configured to control the image pickup portion, the panning/tilting, and the image signal processor; and
a memory configured to store, for each of one or more runways, standby positions at which the image pickup portion is brought into a standby state so that the image signal processor detects the aircraft,
wherein the controller is configured to:
obtain an approaching runway and an approaching direction of the aircraft based on the aircraft information signal received by the signal receiver;
select, based on the approaching passageway and the approaching direction, a corresponding standby position from among the standby positions stored in the memory;
control the panning/tilting driver to the selected corresponding standby position; and
control, when the image signal processor has recognized the aircraft, the panning/tilting driver so as to automatically track the aircraft based on information detected by the image signal processor, and
wherein, when the signal receiver has not acquired a new aircraft information signal after the aircraft is automatically tracked for a predetermined time, the controller controls the panning/tilting driver and the lens apparatus to a previous standby position.

3. The automatic tracking camera system according to claim 2, wherein each of the standby positions comprises a panning position and a tilting position of the panning/tilting driver and a zoom position and a focus position of the lens apparatus.

4. The automatic tracking camera system according to claim 2, wherein the aircraft information signal comprises a horizontal position and an altitude of the aircraft.

5. A method of automatically tracking an object using an automatic tracking camera system, comprising:
an image pickup portion comprising a lens apparatus and an image pickup apparatus;
a driver configured to rotate the image pickup portion in at least one of a panning direction and a tilting direction;
a signal receiver configured to receive an object information signal which an object to be tracked is transmitting;
an image signal processor configured to recognize the object in an image obtained by the image pickup portion, and detect a motion of the object in the image;
a controller configured to control the image pickup portion, the driver, and the image signal processor; and
a memory configured to store, for each of one or more passageways, standby positions at which the image pickup portion brought into a standby state so that the image signal processor detects the object,
wherein the controller is configured to:
obtain an approaching passageway and an approaching direction of the object based on the object information signal received by the signal receiver;
select, based on the approaching passageway and the approaching direction, a corresponding standby position from among the standby positions stored in the memory;
control the driver to the selected corresponding standby position; and
control, when the image signal processor has recognized the object, the driver so as to automatically track the object based on information detected by the image signal processor,
the method comprising:
receiving, from the object, positional information of the object;
obtaining an approaching passageway and an approaching direction of the object based on the positional information;
selecting, based on the approaching passageway and the approaching direction, an optical axis direction, a zoom position, and a focus position of the lens apparatus as a standby position from among prestored values;
controlling the driver to the standby position; and
controlling, when the object has been detected in an image obtained at the standby position through image processing, the driver and the lens apparatus so as to automatically track the object based on information obtained through the image processing, and
when the signal receiver has not acquired a new object information signal after the object is automatically tracked for a predetermined time, controlling the driver and the lens apparatus to a previous standby position.

6. A method of automatically tracking an aircraft using an automatic tracking camera system, comprising:
an image pickup portion comprising a lens apparatus and an image pickup apparatus;
a panning/tilting driver configured to rotate the image pickup portion in at least one of a panning direction and a tilting direction;
a signal receiver configured to receive an aircraft information signal which an aircraft to be tracked is transmitting;
an image signal processor configured to recognize the aircraft in an image obtained by the image pickup portion, and detect a motion of the aircraft in the image;
a controller configured to control the image pickup portion, the panning/tilting driver, and the image signal processor; and
a memory configured to store, for each of one or more runways, standby positions at which the image pickup portion is brought into a standby state so that the image signal processor detects the aircraft,
wherein the controller is configured to:
obtain an approaching runway and an approaching direction of the aircraft based on the aircraft information signal received by the signal receiver;
select, based on the approaching passageway and the approaching direction, a corresponding standby position from among the standby positions stored in the memory;
control the panning/tilting driver to the selected corresponding standby position; and
control, when the image signal processor has recognized the aircraft, the panning/tilting driver so as to automatically track the aircraft based on information detected by the image signal processor,
the method comprising:
receiving, from the aircraft, positional information of the aircraft;
obtaining an approaching runway and an approaching direction of the aircraft based on the positional information;

selecting, based on the approaching passageway and the approaching direction, an optical axis direction, a zoom position, and a focus position of the lens apparatus as a standby position from among prestored values;

controlling the panning/tilting driver to the standby position; and controlling, when the aircraft has been detected in an image obtained at the standby position through image processing, the panning/tilting driver and the lens apparatus so as to automatically track the aircraft based on information obtained through the image processing, and when the signal receiver has not acquired a new aircraft information signal after the aircraft is automatically tracked for a predetermined time, controlling the panning/tilting driver and the lens apparatus to a previous standby position.

7. The automatic tracking camera system according to claim 1, wherein the controller is configured to:

control the driver and the lens apparatus to the selected corresponding standby position; and control, when the image signal processor has recognized the object, the driver and the lens apparatus so as to automatically track the object based on information detected by the image signal processor.

8. The automatic tracking camera system according to claim 2, wherein the controller is configured to:

drive the panning/tilting driver and the lens apparatus to the selected corresponding standby position; and control, when the image signal processor has recognized the aircraft, the panning/tilting driver and the lens apparatus so as to automatically track the aircraft based on information detected by the image signal processor.

* * * * *